Figure 1:
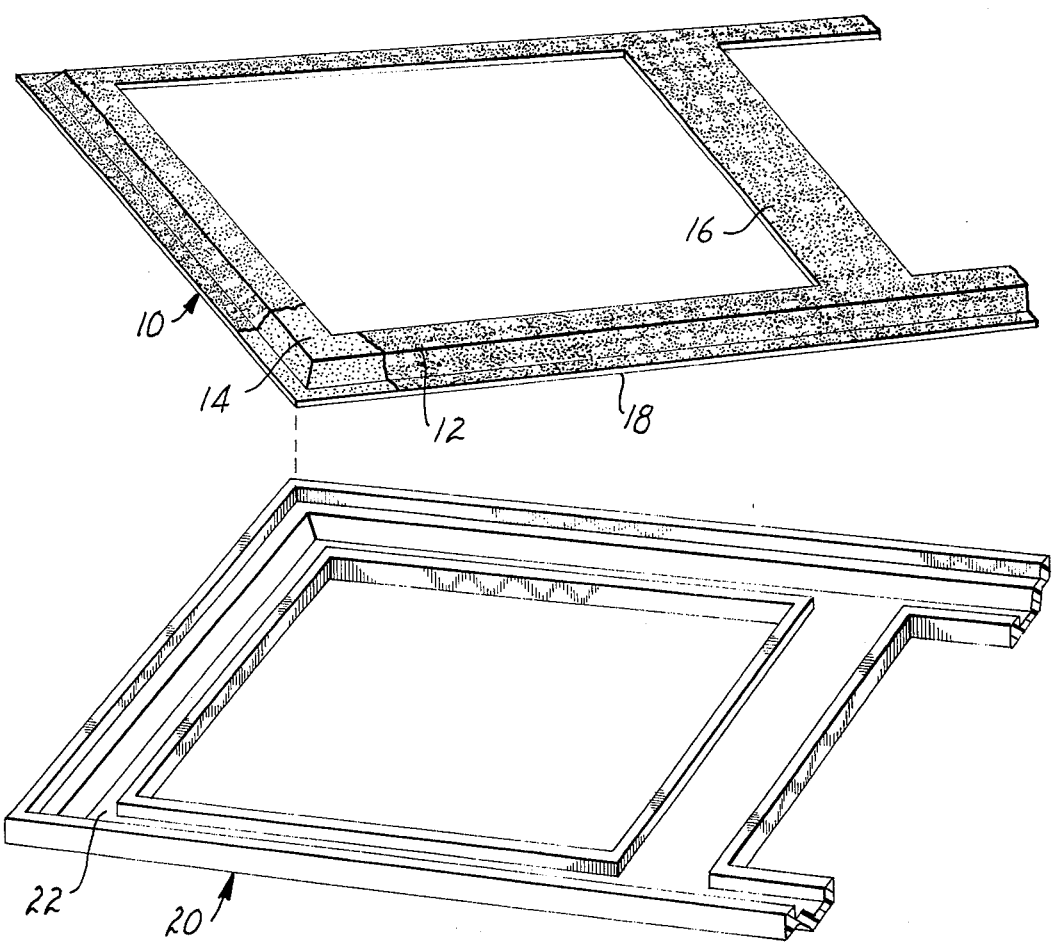

United States Patent [19]
Youngberg

[11] 3,916,046
[45] Oct. 28, 1975

[54] DECORATIVE ADHESIVE LAMINATE, FOR HEAT-PRESSURE APPLICATION TO SUBSTRATES

[75] Inventor: Leo E. Youngberg, Woodbury, Minn.

[73] Assignee: Minnesota Mining and Manufacturing Company, St. Paul, Minn.

[22] Filed: May 29, 1973

[21] Appl. No.: 364,670

Related U.S. Application Data

[63] Continuation-in-part of Ser. No. 179,695, Sept. 13, 1971, abandoned.

[52] U.S. Cl. .................. 428/31; 428/336; 428/519; 427/207; 427/407
[51] Int. Cl.² ............... D04D 7/04; B32B 27/08; B32B 27/30; C09J 3/00
[58] Field of Search ....... 117/685, 33, 76 A, 122 H, 117/122 PA, 72, 76 F, 122 PF; 161/33, 167, 253, 406, 165, 7, 12, 247

[56] References Cited
UNITED STATES PATENTS

| | | | |
|---|---|---|---|
| 2,925,174 | 2/1960 | Stow | 117/76 A |
| 3,257,228 | 6/1966 | Reed | 117/76 A |
| 3,361,609 | 1/1968 | Borack et al. | 116/406 |
| 3,406,039 | 10/1968 | Paufler | 117/76 A |
| 3,420,789 | 1/1969 | Wilson | 117/122 H |
| 3,423,276 | 1/1969 | Eckenroth | 161/167 |
| 3,462,284 | 8/1969 | Vertnik | 106/219 |
| 3,504,475 | 4/1970 | Dickard et al. | 117/76 A X |

*Primary Examiner*—Philip Dier
*Attorney, Agent, or Firm*—Alexander, Sell, Steldt & DeLaHunt

[57] ABSTRACT

An adhesive laminate comprising, in combination, a decorative plastic sheet, a layer of normally tacky, pressure-sensitive adhesive surfacing one side of the sheet, and a thin layer of an effective amount of a non-tacky compatible, non-heat-advancing thermoplastic coating surfacing the pressure-sensitive adhesive. The adhesive laminate is particularly useful for heat-pressure application to the surface of substrates in situations which require movement or positioning of the decorative part against the surface of the substrate prior to heat and pressure bonding.

9 Claims, 2 Drawing Figures

U.S. Patent   Oct. 28, 1975   3,916,046

INVENTOR
LEO E. YOUNGBERG
Kinney, Alexander,
Sell, Steldt & DeLaHunt
ATTORNEYS

DECORATIVE ADHESIVE LAMINATE, FOR HEAT-PRESSURE APPLICATION TO SUBSTRATES

CROSS-REFERENCE TO RELATED APPLICATION

This is a continuation-in-part of application Ser. No. 179,695 filed Sept. 13, 1971 now abandoned.

According to the present invention there is provided an adhesive laminate comprising a decorative plastic sheet surfaced with a tacky pressure-sensitive adhesive with the pressure-sensitive adhesive surfaced with a thin layer of a non-tacky compatible, non-heat-advancing thermoplastic coating on the side opposite the decorative sheet whereby the laminate is capable of being positioned and re-positioned on a surface without adhering thereto until adhesion is desired whereupon; by heating the laminate a strong bond between the laminate and the substrate may be effected. In addition to providing position-ability with the non-tacky thermoplastic coating on the pressure-sensitive adhesive, the non-tacky thermoplastic coating also eliminates the need for a protective removable release liner for the pressure-sensitive adhesive. One of the uses of the present invention is to provide a decorative, three-dimensional laminate having on one side a vacuum formable plastic decorative sheet which may be applied to a three-dimensional substrate surface without premature bonding before the desired conformation or position with relation to the substrate is obtained.

BACKGROUND OF THE INVENTION

At the present time there are many applications for applying decorative films to substrates to simulate an original decorative surfacing such as one of wood, marble, and the like. Also decorative films of plain colors with or without images on the exposed surface are in use for decoration, protection, or information transmittal. The use of such films has increased dramatically in recent years because of their easy application and low cost. Actual wooden articles displaying three-dimensional design ordinarily would have to be individually hand carved or machined, and their production is very expensive, as well as time consuming, thereby limiting their general usage.

One particular useful application for decorative films is on various surfaces of automobiles. Simulated wooden panels have been used in automobile decor, and particularly in such areas as the dashboard. Most dashboards have irregular or bezeled surfaces, and for a decorative film to be placed over these surfaces, the film or laminate, such as a vinyl printed film backed by an acrylonitrilebutadiene-styrene backing, is premolded to conform to the shape of that portion of the dashboard which is to be surfaced with the decorative film. Ideally, a pressure-sensitive adhesive would be placed on the back surface of the decorative layer so that the part may be merely positioned and pressed against the dashboard, the configurations in the thermoplastic and dashboard coinciding so that there is a good fit and adhesive bond. However, where a pressure-sensitive adhesive is used, extreme difficulty in positioning has been experienced in that the presence of many elevations or irregularities allows contact between the pressure-sensitive adhesive and the dashboard such that the adhesive on the part "grabs" the protruding surfaces where the part is to be applied and the part cannot be positioned into all of the recessed irregularities of the dashboard resulting in a poor fit between the decorative film laminate part and the dashboard substrate. On the other hand, if a latent heat-activated adhesive such as the conventional hot-melt type were used in place of a pressure-sensitive adhesive, either there is little or no adhesion between the heat-activated adhesive and the plasstic backing for the printed film, or one is faced with the problem that to obtain adhesion of such thermoplastic backing to the substrate requires hot-melt adhesive having application temperatures which exceed the softening point of the decorative plastic film, thus resulting in distortion or loss of the previously imparted three-dimensional design.

Another use for such decorative films is on truck-trailer vertical surfaces where one applies a decorative or information-carrying marking film to the truck-trailer vertical surface. Such emblem marking films are used on the sides of truck-trailer surfaces in part because application of these marking films is easier and faster and provides a better decorative and information image than painting the image on the trailer surface. These emblems normally have a pressure-sensitive adhesive on one surface for bonding the emblem to the truck surface. Application difficulties have been encountered in applying marking films that have a pressure-sensitive surface to truck-trailer vertical surfaces which are corrugated or have exterior ribs or posts wherein the pressure-sensitive adhesive "grabs" the protruding corrugations or ribs and makes positioning of the marking film emblem difficult. Emblems for such truck-trailer surfaces are frequently applied in sections because the size of the total emblem is too large to apply in one piece, or because the emblem is of an intricate shape or design. Since these sections must be accurately registered with one another, the pressure-sensitive adhesive on the emblem surface makes positioning of the emblem sections in registration difficult to accomplish.

Various combinations of adhesive layers have been used for various purposes, and methods and means devised to allow one to achieve positionability of pressure-sensitive coated sheet materials.

In U.S. Pat. No. 2,148,137, a composite adhesive is disclosed which comprises a plastic cohesive material having a non-sticky cementitous material thereon which may be water activated. The laminate is useful for adhering removable decorative surfacing to floors, etc. However, water activation is usually unsuitable for adhering a decorative part to a surface having many indentations and elevations and, moreover, decorative sheeting would be easily peeled off when moistened, particularly on a truck-trailer surface exposed to wet weather. In U.S. Pat. No. 3,343,978, a composite adhesive and a heat-activated adhesive which is separated in use such that substrate surfaces may present either the pressure-sensitive adhesive or the hot-melt adhesive for future ahesion. Such a "pull apart" construction, having varying cohesive and adhesive strengths, would not be useful for the permanent bond purpose described herein. A firm, substantially non-releasable semi-permanent bond is desired, i.e. a bond which makes it difficult to remove the decorative laminate after application, and one which resists disruption upon exposure to large changes in temperature and humidity, particularly after aging and when subjected to vibration, etc. as experienced when applied to the interior or exterior of a vehicle.

Various methods and means to provide "slidable" pressure-sensitive adhesive surfaces are known in the art and illustrated, e.g. in U.S. Pat. Nos. 3,413,168, 3,331,729, and 3,314,838. These prior art references disclose controlled slidability through the use of crushable spheres, the spheres protruding from the surface of the adhesive, allowing positioning of an article and, thereafter, upon crushing of the spheres by pressure, allowing bonding between the pressure-sensitive adhesive and the surface. However, if the substrate is to be applied to irregular, contoured, bezeled surfaces, it is difficult or impossible to crush all of the spheres and effect a complete bond with all of the underlying substrate.

U.S. Pat. No. 3,301,741 also provides a slidable adhesive sheet by providing adhesive protrusions that are capped with non-adhesive fragile protective caps that break or fold when pressure is applied allowing a bond to be effected. However, as mentioned above, the problem of incomplete bonding when applying this sheet material to irregular surfaces is encountered.

Powdered overcoats for controlling the blocking tendencies of a sheet coated with a solvent-activated adhesive or a pressure-sensitive adhesive have been described in U.S. Pat. No. 3,531,316. The powdered overcoat consists of an organic solvent soluble thermoplastic material containing a powdered insoluble polymer. To effect a bond, one must first apply a solvent which will dissolve and penetrate the soluble overcoating material and activate the adhesive. The insoluble anti-blocking powdered component remains in place and the patentee states that his overcoatings "have less utility with pressure-sensitive adhesives".

U.S. Pat. No. 3,257,228 uses a pressure-sensitive adhesive overcoated with a heat-sensitive adhesive to provide anti-blocking layer over the pressure-sensitive adhesive. The heat-sensitive adhesives of this patent are film-forming, heat-advancing and not soluble in the pressure-sensitive adhesive at the bonding temperatures employed. Thus, after application to a substrate the labels of this reference can be repeatedly peeled away from the substrate and re-applied thereto because the internal strength of the heat-sensitive material has increased and its bond to the substrate is greater than the adhesion of the pressure-sensitive adhesive to the now heat-advanced materials. Variations of the just-described system is found in U.S. Pat. No. 3,343,978. In one variation, the heat or solvent activated overcoating bonds to the substrate and the pressure-sensitive adhesive and backing can be peeled away from the bonded overcoating layer; in the other variation the solvent or heat-activated layer and the pressure-sensitive layer remain bonded to the substrate and the backing can be peeled from the pressure-sensitive layer to expose the same.

British Pat. No. 1,065,714 describes the use of water-soluble resins for use as anti-blocking surfaces of pressure-sensitive vinyl coated decorative film. The problem with solvent dissolved adhesives or water soluble resins is that the water or solvent has to be driven off before the adhesive will bond to other surfaces. Where the backing is solvent-impervious, the solvent must be squeezed out from under the backing to effect bonding. If there are many undulations, grooves, or deviations in either or both of the surfaces, the solvent remains trapped thereunder, resulting in a poor bonding.

SUMMARY OF THE INVENTION

According to the present invention, there is provided a decorative laminate comprising, in combination, a decorative plastic sheet, a layer of normally tacky, pressure-sensitive adhesive surfacing one side of the sheet, and a thin layer of an effective amount of a non-tacky, compatible, non-heat-advancing, low temperature melting thermoplastic coating. The coating layer over the pressure-sensitive adhesive provides a low tack surface eliminating the need for a removable release liner and provides easy positioning of the decorative part prior to heat and pressure bonding, without interfering with the strength of the bond, and in preferred embodiments, providing a greater bond strength than that which can be achieved using either the pressure-sensitive adhesive alone or the coating layer material alone.

In the presently preferred embodiment the exterior decorative sheet is a three-dimensional structure of thermoplastic material, usually a printed vinyl sheet having an acrylonitrile-butadiene-styrene backing.

Hereinafter the acrylonitrile-butadiene-styrene resin materials whether in sheet or panel form may be referred to as ABS, and the pressure-sensitive adhesives as PSA or P-S adhesive.

Without being limited to this theory, it is thought that the heat and pressure bonding of the low tack laminate results in the thin non-tacky low melting thermoplastic coating being taken up by the P-S adhesive in some unknown manner (possibly due to mutual partial solubility) and that the PSA provides at least most of the adhesion between the decorative laminate and the substrate surface. In some instances the coating material may be improving the internal strength of the PSA, and in any event the amount employed is such that it does not interfere with a good bond being formed between the ABS and the substrate.

Figure 2:
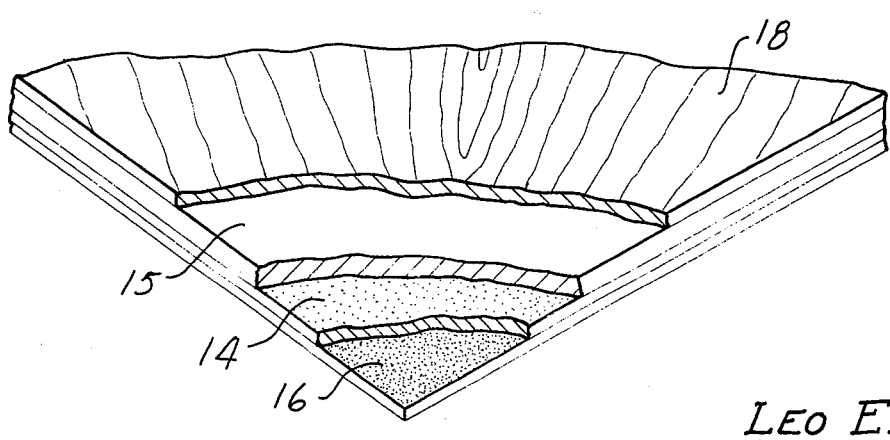

In the accompanying drawing:

FIG. 1 is a perspective view of a portion of an automobile dashboard and the underside of a decorative laminate which is to be adhered to that dashboard; and FIG. 2 is a partial cross section of a portion of the adhesive laminate of the present invention.

Various decorative articles are presently fabricated from a heat-formable, vacuum-formable, thermoplastic printed film. There are many such films, a presently preferred one being an ABS-vinyl sheet stock laminate which is coated with a high wet grab PSA for bonding to a surface. This laminate, as sold commercially, normally has a polypropylene release, liner overlying and protecting the PSA. The laminate is sometimes fabricated in a particular configuration, particularly where a highly defined three-dimensional shape is desired. The laminate may be placed in a female vacuum forming mold, vinyl face down, and formed to the shape of the mold using a vacuum of about 500–700 mm. of mercury and at a temperature of about 300°–350°F. The formed part may be then die-cut into particular strip sections, usually about ½ inch in width and 7 inches long, which are bonded to the correspondingly bezeled section of an automobile dashboard part. The bonding to the dashboard is accomplished by heat-pressure bonding with a "polytetrafluoroethylene"-coated shoe using 250°F. temperature and about 80 pounds per square inch pressure.

Long slender sections, such as described above, are rather flexible and extremely difficult to position because of the instant grab of the P-S adhesive. This problem may be appreciated by referring to FIG. 1 wherein the dashboard 20 exhibits particular configurations such as the groove 22 shown therein. The formed decorative part 10 is molded such that its outer diameter is suited to be received snugly by the inner diameter of the dashboard 20. Consequently, it is desirable that the edge 12 of the decorative part will snugly coincide in the groove 22 of the dashboard part. If the part 10, having only a P-S adhesive on the back thereof, is inserted into the corresponding deviations and grooves in the dashboard 20, the P-S adhesive may "grab" portions of the dashboard before all of the lower or valley surfaces between the part and the dashboard snugly fit together to provide complete bonding between mating surfaces of the parts.

An additional problem occurs during manufacture of the decorative sheet at the time the part is die-cut. Exposing the polypropylene release liner to 300+°F. temperature embrittles the liner, resulting in a shattering of the liner by the die cutting operation and subsequent difficulty in removing the liner from the die-cut part.

The present invention has remedied the deficiencies encountered in the original process of manufacture of the finished decorated automobile panel. In one embodiment of the present invention, the P-S adhesive surface of the decorative sheet material is dusted in excess with a powdered low temperature melting, hot-melt (heat activated) adhesive such as the polyamide resin sold by General Mills, Inc. under the trade mark "Versalon" 1300; i.e., the entire PSA surface is covered to a thickness of one particle with heat-activated adhesive powder. The use of an adhesive powder provides a convenient means for applying the detackifying coating material on the pressure-sensitive adhesive and can be accomplished by merely sprinkling the powder by hand onto the adhesive. However, there are several disadvantages to this embodiment of the invention as will be discussed hereinafter and other means for providing thin layers of a non-tacky, compatible, non-heat-advancing low temperature melting thermoplastic resinous overcoatings for the P-S adhesive are presently preferred in practicing the present invention. For example, the heat-activated adhesive or thermoplastic resin my be solution sprayed in a thin layer over the P-S adhesive surface, or the same solution may be coated and dried on a silicone release liner to form a thin layer which can then be transfer bonded to the tacky PSA surface rendering it completely tack free. Unless the thermoplastic coating is maintained at about ¼ mil (0.064 mm) or less, the bond strengths of the heat and pressure applied laminate may be adversely affected. Moreover the thermoplastic coating must not form a barrier film at the bonding temperatures employed, but rather should exhibit a degree of solubility in and/or compatability with the PSA.

It appears that these thin thermoplastic coatings either do not form a continuous film over the PSA, or are friable, and such characteristics permit the intermingling and solubility effects needed to obtain good bonds under the temperature and pressure conditions employed in applying the decorative laminate to a substrate.

After the pressure-sensitive adhesive surface of the decorative sheet is covered with the heat-activated adhesive powder or provided with the thin thermoplastic coating by the above-mentioned solution coating or transfer coating techniques, the entire sheet may be given the desired three-dimensional shape by forming in a vacuum-forming mold using a vacuum of 500–700 mm. Hg. at a temperature of about 300°–350°F. for about 2 minutes. If the resin was applied in powdered form, the heating causes puddling of the hot-melt adhesive on the surface resulting in a somewhat discontinuous surface. In other words, the resultant adhesive surface has non-tacky areas of thermoplastic resin as high surfaces and very low or no tack thinly covered pressure-sensitive adhesive valley areas interjacent the higher non-tacky coated areas. On the other hand, the presence of the transfer coat release sheet during the vacuum molding of decorative laminates produced by the transfer coating metlod apparently hinders or prevents any puddling of the thin thermoplastic coating on such laminates. In any event, the formed sheets having such coatings thereon have sufficiently low tack to allow protection against blocking with simple slip sheets, in fact with preferred embodiments, no slip sheet is necessary.

With reference to the drawing, the P-S adhesive 14, surfacing the decorative vinyl film 18, is itself surfaced with a thin detackifying thermoplastic coating 16. The detackifying coating as noted above, may in some instances form high intermittent areas of thermoplastic resin. Although applicant does not intend to be bound thereby, it is thought that the puddling of the detackifying coating 16, allows portions of the P-S adhesive 14 to be at least slightly exposed in the areas of non-puddling upon heat activation during application. However, any exposed portion of the P-S adhesive before activation, is protected by the hot melt thermoplastic detackifying resin at least to the extent that the decorative laminate adhesive side is normally non-tacky and may be easily positioned.

The decorative laminate 10 of FIG. 1, even if quite flexible, is easily positioned into the matching bezeled section 22 of the instrument panel part of the dashboard 20 of FIG. 1, and may be bonded thereto with a pressure shoe at 250°F. and 80 pounds per square inch.

As more specifically discussed hereinafter in connection with the Examples, with certain embodiments of the invention a superior bond has been observed for the decorative laminates provided with the detackifying thermoplastic coating compared to the same laminate without the detackifying coating over the PSA. For example, for some of the decorative laminates the peel strength of the adhesive bond is increased substantially over the peel strength of 3 pounds per inch width for the control laminate coated with the PSA alone, or the substantially 0 pounds per inch width peel strength observed when the PSA is eliminated and the ABS surface of the laminate is applied to the substrate using only the thermoplastic coating material alone to effect the bond.

The P-S adhesive 14 should be one which adheres well to both the surface of the decorative laminate to which it is applied, and is also selected to be adherent to the intended substrate. Examples of useful P-S adhesives are the acrylic P-S adhesives, particularly the acrylate compolymers described in Ulrich U.S. Pat. No. Re. 24,906. Examples of useful non-tacky, non-heat-advancing thermoplastic coating materials are the polyamide heat-activated adhesives such as those sold under the trademark "Versalon 1112" and "Versalon 1300" by General Mills Inc, those sold under the trade mark "Emery 3796-D" and "Emery 3749-D" by Emery Industries, Inc.; thermoplastic acrylic resins such as those sold under the trade mark "Elvacite 2045" by E. I. Du Pont de Nemours; acrylic heat-activated adhesives such as those sold under the trade designation "Acrylic Adhesive 6870" by Du Pont; polyester heat-activated adhesives such as that sold under the designation "Adhesive 46950" by E. I. Du Pont de Nemours and Co.; vinyl chloride-vinyl acetate copolymer resins such as that sold under the trade mark "VAGH" resin by Union Carbide Corp; vinyl acetate based adhesives such as that sold under the trade mark "Elvax 220" by Du Pont, and that sold under the trade designation "USM 6390" by United Shoe Machinery Co. All of the above named thermoplastic coating materials are compatible with and appear to be at least partially soluble in pressure-sensitive adhesive formed from a copolymer of 95 parts of isooctyl acrylate and 5 parts of acrylic acid.

The "Versalon 1300" polyamide resin has a softening point, ball and ring (ASTM E 28-58T) of 95°C., a viscosity, Brookfield, at 210°C. of 20 poises, a specific gravity of 0.97 and a suggested application temperature range of 325° to 375°F. The "Versalon 1112" polyamide resin has a softening point (same method as above) of 105°–115°C., a viscosity at 190°C. of 30–40 poises, a specific gravity of about 0.95 and a heat-sealing range of 185°–284°F. The "Emery 3749-D" has a softening point (same procedure as above) of 95°C. and a viscosity of 160°C. of 14 poises. The "Emery 3796-D" polyamide resin has a softening point of 110°C. and a viscosity at 190°C. of 100 poises. The "Du Pont 46950" adhesive is reported as a polyester solution of 20 ± 2% solids with a viscosity of 100–200 centipoises at 25°C. The base resin has a specific gravity of 1.33 and a melting range of 118°–135°C. The "Elvacite 2045" is believed to be based on isobutyl methacrylate having an inherent viscosity of 0.66 when 0.25 grams of the polymer in 50 ml of chloroform is measured at 20°C. using a number 50 Cannon-Fenske Viscometer.

EXAMPLES 1–9

To illustrate the improved adhesion of the structures of the present invention a laminate of ABS sheet and a vinyl film (also herein referred to as a vinyl plastic laminate), having a 95:5 isooctyl acrylate-acrylic acid pressure-sensitive adhesive thereon was surfaced with a powdered polyamide ("Versalon 1112") heat-activated adhesive which has a m.p. of 235°F., the entire composite being activatable at about 200°F. which is less than the melting point of the heat-activated adhesive alone. The polyamide heat-activated adhesive performs as an anti-blocking layer. Samples were made for comparison using no heat-activated adhesive, using talc, and using glass bubbles over the PSA. In all cases, the test materials were bonded to a ⅛ inch thick ABS panel. The panel had a pebble-type camera case finish surface. The desired coating weight ratio is about 12 to 14 grains of pressure-sensitive adhesive per each 4 × 6 inch sample and about 0.65 grams to about 4.5 grams of the polyamide heat-activated adhesive per 4 × 6 inch sample. The test panels were bonded to this clean ABS surface using 250°F. and 80 pounds per square inch pressure for 3 minutes. Samples were 6 × 9 inches in size with a bonded surface of 6 × 7 inches to allow a 2-inch grab for Instron testing. Tests were performed on the Instron machine at room temperature as a 90° peel, 12 inch/minute pull rate on a 2-inch wide strip, run as a triplicate from the cut 6 × 9 inch bonded panels. Average numbers are reported.

TABLE I

| Example | Base Sheet | Wt. Base | Coating Wt. (6" × 7") | Coating | 90° Peel lbs./inch width |
|---|---|---|---|---|---|
| 1 | Vinyl plastic laminate | 27.7 gms. | 5.4 gms. | Polyamide | 0.2 |
| 2 | Vinyl plastic laminate—pressure-sensitive adhesive | 34.0 gms. | 1.0 gms. | Polyamide | 4.7 |
| 3 | Vinyl plastic laminate—pressure-sensitive adhesive | 33.2 gms. | 3.8 gms. | Polyamide | 5.0 |
| 4 | Vinyl plastic laminate—pressure-sensitive adhesive | 33.5 gms. | 6.2 gms. | Polyamide | 2.7 |
| 5 | Vinyl plastic laminate—pressure-sensitive adhesive | 31.0 gms. | 0.5 gms. | Talc | 3.8 |
| 6 | Vinyl plastic laminate—pressure-sensitive adhesive | 30.7 gms. | 1.1 gms. | Talc | 2.0 |
| 7 | Vinyl plastic laminate—pressure-sensitive adhesive | 33.5 gms. | 0.2 gms. | B-30-B Glass Bubbles | 2.1 |
| 8 | Vinyl plastic laminate—pressure-sensitive | 33.0 gms. | 1.1 gms. | B-30-B Glass Bubbles | 1.7 |
| 9 | Vinyl plastic laminate—pressure-sensitive adhesive | AS CONTROL | | NONE | 3.0 |

Examples 2 through 8 demonstrate the difference between coating the pressure-sensitive adhesive with a heat-activated adhesive and with an incompatible material as an anti-blocking agent which is absorbed into the P-S adhesive during the heat and pressure bonding cycle.

As noted above, the polyamide heat-activated adhesive by itself (Example 1) is quite ineffective as a bonding adhesive to the ABS pebble surface at this temperature and pressure. High bonding temperatures e.g. above about 250°F. cannot be used because the three-dimensional pattern duplicated in the vinyl surface would be destroyed by the higher temperatures required to use high temperature heat-activated adhesives. Comparing control Example 9 with Examples 2 and 3 shows the improved bond strength which may be achieved when using this polyamide heat-activated adhesive in combination with the acrylic pressure-sensitive adhesive. Example 4 indicates adhesion loss in the bond when excessive amount of this hot-melt is used, which loss demonstrates the need for combining the proper proportions of hot-melt polyamide adhesive and acrylic pressure-sensitive adhesive.

EXAMPLES 10–16

Examples 10 through 16 demonstrate that various detackifying coating materials may be used in the present invention. Solutions were made in suitable solvents of "Versalon 1300" polyamide resin, "Elvacite 2045" acrylic resin, "VAGH" vinyl copolymer, "DuPont 46950" polyester heat-activated resin, "Elvax 220" vinyl acetate based adhesive, "USM 6390" vinyl acetate based adhesive, and "Acrylic Adhesive 6870". These dilute solutions were printed from a 100 line rotogravure printing plate onto a polypropylene liner and dried. The dried coated liners were laminated to the pressure-sensitive adhesive surface of a vinyl plastic laminate of a total thickness of 17 mils for the vinyl and ABS sheet and with the pressure-sensitive adhesive an acrylic adhesive of 2 mils of thickness. Two samples of each decorative laminate with the different detackifying coatings were bonded with the polypropylene liner removed to a smooth surface ABS panel at 100 pounds pressure, 15 seconds dwell, and at 175°F., 200°F., and 225°F. temperatures. The bonded laminates were allowed to stand at room temperature for 24 hours before adhesion peel backs were measured on an Instron machine at a pull back rate of 2-inches per minute and a 90° peel. Samples of the decorative laminates prior to bonding were checked for tack, and the results of this and the average of the two adhesion peel backs are reported in Table II.

Table II

| Example No. | Detackifying Coating Material | Amount of Tack | Bond at 175°F. lbs./in. | Bond at 200°F. lbs./in. | Bond at 225°F. lbs./in. |
|---|---|---|---|---|---|
| 10 | Versalon 1300 | None | 8.3 | 8.5 | 7.2 |
| 11 | Elvacite 2045 | None | 6.9 | 7.9 | 7.5 |
| 12 | VAGH | Slight | 9.0 | 7.6 | 8.3 |
| 13 | DuPont 46950 | Very slight | 7.6 | 7.2 | 7.0 |
| 14 | Elvax 220 | Very slight | 7.9 | 7.8 | 7.1 |
| 15 | USM 6390 | Slight | 8.7 | 8.6 | 8.6 |
| 16 | DuPont 6870 | Slight | 7.4 | 7.9 | 8.1 |
|  | None (Control) | Extremely |  | 8.7 |  |

EXAMPLES 17–23

Examples 17 through 23 illustrate that the bond strength is dependent on the pressure-sensitive adhesive rather than primarily on the detackifying coating. It is known that the bond strength of an acrylic pressure-sensitive adhesive is related to the thickness of the adhesive up to a certain thickness when the bond values level off and become relatively independent of adhesive thickness. Examples 17 through 23 were prepared by coating an acrylic adhesive of approximately 30% solids solution onto a release liner at various openings of a knife coater. The adhesives were dried and laminated to the ABS side of a vinyl film ABS laminate and then a thin coating a Versalon 1300 was transferred to the PSA surface from a release liner. These laminates with the protective release liner removed were bonded to a smooth ABS panel at 200°F., 100 pounds per square inch pressure, and 15 seconds dwell, and after 24 hours dwell at room temperature, adhesion values were measured as described in Examples 10 through 16. The average bond values of two samples are reported in Table III. An examination of Table III demonstrates that the bond values of the decorative laminate with the detackifying coating is related to the pressure-sensitive adhesive thickness.

Table III

| Example No. | PSA Coating Orifice mils (before drying) | Bond Strength lbs./in. |
|---|---|---|
| 17 | 2 | 1.9 |
| 18 | 5 | 4.4 |
| 19 | 8 | 10.5 |
| 20 | 12 | 12.5 |
| 21 | 14 | 13.8 |
| 22 | 17 | 14.5 |
| 23 | 20 | 13.2 |

EXAMPLES 24–26

Dilute solutions of three polyamide heat-activatable adhesives were prepared at 15% solids in solvent and coated in the same manner as described in connection with Examples 10 through 16. The dried coatings of about ⅛ mil or less thickness were laminated to the PSA coated surface of an ABS-vinyl sheet to provide decorative laminates having a total thickness of 29 mils. Bonding of these decorative laminates to smooth ABS panels were made at 200°F., 100 psi., and 15 seconds dwell. After 24 hours dwell bond values were measured as for Examples 10 through 16. The reported bond values are the average of three measurements in the results tabulated below.

| Example No. | Detackifying Adhesive Coating Material | Bond Strength lbs./in. |
|---|---|---|
| 24 | Versalon 1300 | 12.7 |
| 25 | Emery 3796-D | 13.7 |
| 26 | Emery 3749-D | 15.4 |

The just described dilute polyamide solutions were also coated on to the ABS side of 17 mil ABS-vinyl sheet in the absence of any PSA, and bonding to a smooth ABS panel at 200°F. and 250°F. with 100 psi and 15 seconds dwell was attempted but these decorative laminates would not adhere to the ABS substrate panel.

EXAMPLE 27

A decorative laminate prepared as in Example 24 was bonded to a substrate as in Examples 10 through 16 except the bonding temperatures and dwell times were varied. Table IV shows the results of the measurements which were performed as described in Examples 10–16. This example demonstrates the improved bond strength which may be achieved when using thin coatings of a non-tacky compatible low temperature melting, non-heat-advancing polyamide hot-melt adhesive as the detackifying coating over acrylate PSA. This combination illustrates presently preferred embodiments of the present invention.

Table IV

| Temp. F. | Control 10 sec. dwell lbs./in. | Versalon 1300 Detackifying Coating | | |
|---|---|---|---|---|
| | | 5 sec. dwell lbs./in. | 10 sec. dwell lbs./in. | 15 sec. dwell lbs./in. |
| 125 | — | — | 5 | — |
| 150 | 6.6 | 8.4 | 9.4 | 10.0 |
| 175 | 6.2 | 12.6 | 12.0 | 12.2 |
| 200 | 8.0 | 12.0 | 11.0 | 12.8 |
| 225 | 7.4 | 10.4 | 11.8 | 12.2 |
| 250 | 7.9 | 9.2 | 9.0 | 10.2 |

EXAMPLES 28 AND 29

These examples illustrate the inverse relationship between the detackifying coating thickness and the resulting adhesion bond strength. In each case the decorative laminates were the same except that two detackifying coating materials, Versalon 1300 (Example 28) and Elvacite 2045 (Example 29) were used, and in varying coating weights. The decorative laminates were bonded at 200°F. with 100 psi and 10 seconds dwell. Adhesion values were measured as described in Examples 10-16. Table V tabulates the results of these measurements.

Table V

| Detackifying Coating | Coating Weight Grains/4" × 6" | PS Adhesive Thickness mils | Adhesion lbs./in. |
|---|---|---|---|
| None (Control) | — | 2 | 4.4 |
| Versalon 1300 | 0.13 | 2 | 4.5 |
| " | 0.20 | 2 | 3.2 |
| " | 0.62 | 2 | 2.4 |
| " | 0.75 | 2 | 2.2 |
| " | 0.75 | 0 | 0 |
| Elvacite 2045 | 0.13 | 2 | 4.3 |
| " | 0.18 | 2 | 3.8 |
| " | 0.37 | 2 | 3.6 |
| " | 0.50 | 2 | 0 |
| " | 0.50 | 0 | 0 |

Because of the drop in adhesion values experienced with increased thickness of the thermoplastic coating layer, it is generally preferred that this layer be quite thin, having a dry thickness of up to about 0.25 mil.

EXAMPLE 30

A decorative laminate of a 2 mil thick vinyl film coated on one side with an acrylate PSA over which a thin layer of Versalon 1300 had been transfer coated was heat and pressure bonded at 200°F. in a vacuum bag laminator to an ABS panel. The bonded sample was allowed to remain at room temperature for 24 hours before adhesion peel values were measured. The Versalon 1300 coated laminate had an adhesion value of 8.0 pounds per inch of width, a control sample of the same vinyl film and pressure-sensitive adhesive without the Versalon 1300 detackifying coating had an adhesion value of 7.5 pounds per inch of width.

What is claimed is:

1. A laminate article having a low tack adhesive surface thereon and capable of being positioned on a substrate surface without adhering thereto until desired, said article comprising in combination:
   a. a sheet;
   b. a layer of normally tacky pressure-sensitive adhesive firmly bonded to and surfacing at least one side of said sheet; and adhering to the surface of said adhesive,
   c. low tack means for temporarily preventing adhesion between said adhesive and another surface contacted by said adhesive, characterized by the feature that the said low tack means is an effective amount of a substantially non-tacky, compatible, non-heat-advancing, low-temperature softening thermoplastic coating, whereby the said coating loses its identity as a separate layer and a good pressure-sensitive adhesive bond is formed between the said article and the said substrate surface upon the application of heat and pressure.

2. The laminate of claim 1 wherein said sheet comprises a thermoplastic material.

3. The laminate of claim 2 wherein said thermoplastic material is a vinyl sheet having an acrylonitrile-butadiene-styrene backing to which the pressure-sensitive adhesive is adhered.

4. The laminate of claim 2 wherein said pressure-sensitive adhesive is an acrylic adhesive.

5. The laminate of claim 2 wherein said thermoplastic coating is a low temperature polyamide hot-melt adhesive.

6. A decorative three-dimensional laminate having a low tack adhesive surface thereon comprising, in combination:
   a three-dimensional structure comprising a heat formable printed vinyl film backed with an acrylonitrile-butadiene-styrene polymer;
   a normally tacky pressure-sensitive adhesive surfacing one side of said structure; and
   a thin layer of a compatible, non-heat-advancing, low temperature softening, thermoplastic coating surfacing said pressure-sensitive adhesive, said thermoplastic coating being substantially non-tacky;
   whereby said laminate is easily positioned on a surface without adhering thereto and, thereafter capable of being heat and pressure bonded to a substrate to provide a bond to said substrate which is at least approximately equal to the bond strength of said pressure-sensitive adhesive to said substrate in the absence of said thermoplastic coating.

7. The laminate of claim 6 wherein said thermoplastic coating layer has a thickness up to about 0.25 mils.

8. The laminate of claim 6 wherein said pressure-sensitive adhesive is an acrylic adhesive.

9. The laminate of claim 8 wherein said thermoplastic coating is a low temperature polyamide hot-melt adhesive.

* * * * *